March 30, 1943.  A. J. BAAGØE  2,315,181
WEIGHING MACHINE WITH DIGIT INDICATION OF WEIGHING VALUE
Filed Jan. 9, 1940

Inventor,
A. J. Baagøe

By: Glascock Downing & Seebold
Attys.

Patented Mar. 30, 1943

2,315,181

UNITED STATES PATENT OFFICE 2,315,181

WEIGHING MACHINE WITH DIGIT INDICATION OF WEIGHING VALUE

Anthon Johannes Baagøe, Paris, France; vested in the Alien Property Custodian

Application January 9, 1940, Serial No. 313,114
In Denmark January 14, 1939

5 Claims. (Cl. 116—129)

This invention relates to a weighing machine of the type in which feeler members are caused to cooperate with a perforated member to effect the setting of indicating or printing means.

In such weighing machines it is often important that the graduated markings of the indicating device be of such size that they can be read at a rather great distance. This may be attained by making the usual indicating wheels or type drums, so big that the individual marks thereon are legible at a great distance. This solution of the problem entails, however, the disadvantage that the indicating wheels or the drums will have a comparatively great mass, which necessarily entails a reduction of the velocity of the weighing operation, as the digit wheels or the drums require a comparatively long time for being set in motion and for coming to rest again.

This invention aims at solving this problem in another way, in which the disadvantage can be avoided, and in which a speedy weighing operation can be attained in combination with the possibility of making the weight indicating markings as large and easily readable as it be desired. According to the invention this is chiefly attained by each of the feelers being coupled to a selecting member which is, by the motion of the feeler, guided so as to take up a position, in which among a number of weight indicating members, it can actuate the one corresponding to the weight sensed by the feeler, said member being thereby permitted to move from a position, in which it is concealed to a position, in which it is visible.

Figure 1:
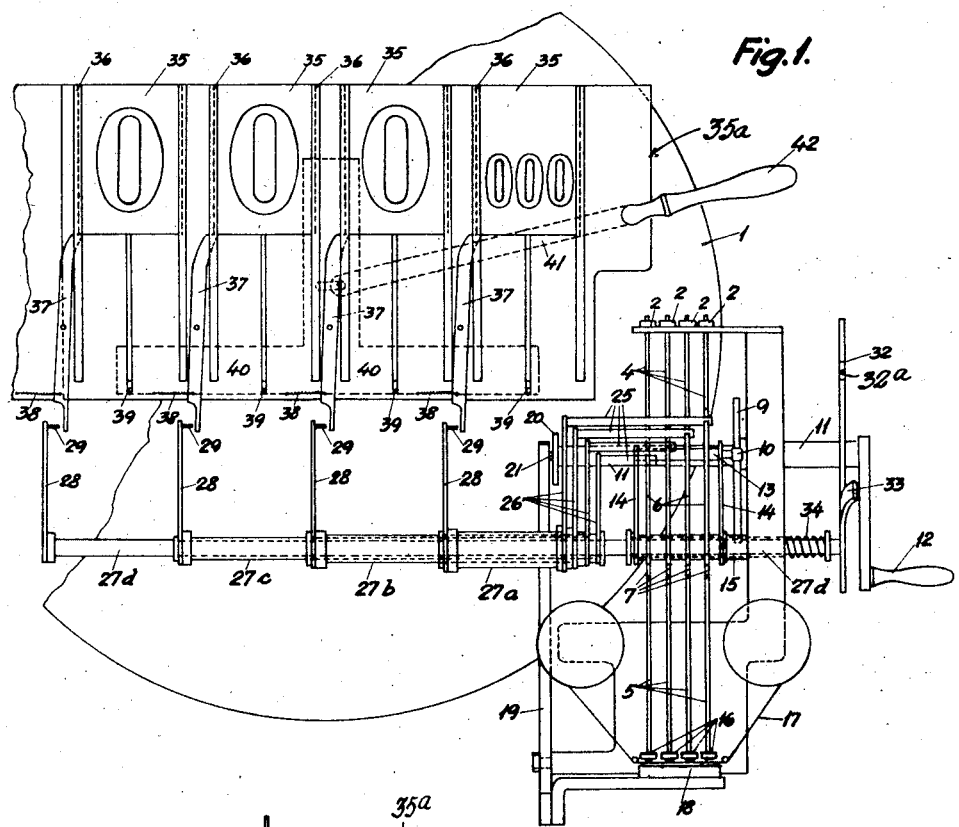
Figure 2:
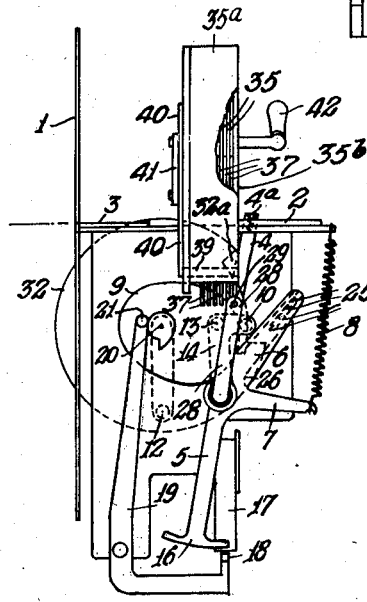

For the further explanation of the details of the invention a constructional form for a weighing machine in accordance with the invention is shown on the accompanying drawing, in which:

Fig. 1 is a front view of the weighing machine in which the weighing mechanism proper, front of the indicator housing and other parts unnecessary for understanding the invention have been omitted, and Fig. 2 a side view of the weighing machine, partly in section.

The weighing machine shown is of the kind disclosed in my prior Patent No. 2,163,183, dated June 20, 1939, in which the disc 1 provided with a system of holes arranged in groups, is moved in angular degree proportional to the setting of the weighing apparatus. For the purpose of simplifying the disclosure the weighing apparatus and arrangement of the perforations are not shown on the drawing. With the disc 1, there cooperates a number of feelers 2, consisting of rods, slidable at right angles to the plane of the disc 1, each of the said rods carrying a number of needles 3, which can engage with the holes of the disc 1. The weighing machine shown is arranged for a weighing range of 0–199,800 kilogrammes in steps of 200 grammes. For such a machine four groups of indicating plates are required for indicating the setting of the weighing apparatus, the first three of the groups of plates indicating hundreds, tens and units respectively, whereas the fourth indicates the decimals in the order of: 000, 200, 400, 600 or 800. In accordance with this arrangement of indicating plates the weighing machine is provided with four feelers, each cooperating with one of an equal number of groups of perforations in the disc 1.

The motion of each of the feelers 2 is transmitted through a forked connection 4a to one arm 4 of a multi-armed lever 4, 5, 6, 7. Another arm 5 of this lever carries an arcuate printing member 16 which is provided with types, by means of which the member corresponding to the weight of the article placed on the weighing platform, can be printed on a paper slip 17 by means of a printing hammer or stamp 18, placed on a lever 19, the operation of which will be further explained below.

Another arm 7 of the lever 4, 5, 6, 7 is arranged for the connection of a spring 8, the object of which is to give the feeler 2 in question a motion towards the disc 1. This motion, in the position of rest of the weighing machine and during the movement into position of equilibrium of the weighing mechanism is prevented by a stop rod 13 against which the arms 4 bear. This rod 13 is attached between arms 14 which can turn around an axle 15, and movement is imparted thereto by a roller 10 fitted to one of the arms 14, and engaging the circumference of a cam disc 9, which is secured to an axle 11 provided with a handle 12. When the axle 11 is turned by means of the handle 12, the rod 13 will be displaced, whereby the arms 4 and also the feelers 2 are permitted to move under the influence of the springs 8, the extent of movement of the needles 3 being determined by the number of perforations in the disc 1 in line therewith. On the axle 11 there is another cam disc 20 co-operating with a roller 21 on the lever 19, whereby the latter is moved so as to displace the member 18 and effect the printing operation.

The fourth arm 6 on each lever 4, 5, 6, 7 is provided with a bifurcation into which engages a pin 25, which is attached to a turnable crank arm 26. Each arm, through one of a number of coaxial shafts 27a–27d, is connected with a selecting member 28 consisting of a arm secured to the shaft in question, the said arm carrying at its free end a pin 29. The shafts 27a–27d are able to turn freely in relation to one another, but they cannot be axially displaced in relation to one another. They may, on the other hand, be displaced as a whole, with the innermost shaft 27d which is accommodated in bearings in the framing. By means of a spring 34, one end of the shaft 27d is pressed against a disc 32 on the axle 11. The disc 32 is provided with a circumferential cut-away portion 32a, which, at a certain moment during the rotation of 11, permits the shaft 27d to slide axially to the right, from which position, by the continued rotation of the axle 11, it is returned to initial position by an inclined surface 33 at the opposite end of the cut-away portion.

The weight indicating members consist in each denominational place of a number of plates 35 placed behind each other, which are guided in vertical guide rails 36 in an indicator housing 35a. In the first denominational place, representing the hundreds, there are in the example chosen only two such plates 35 bearing the digits 0 and 1. As regards each of the two next denominational places there are ten such plates, each bearing one of the digits 0–9. In the case of the fourth digit place there are only five plates, each with one of the indications 000, 200, 400, 600 and 800. The plates when in inoperative position are in the upper part of the housing 35a, in which position they are hidden, and they are held in this position by a corresponding number of pawls 37, which by means of springs 38 are held in a position in which they project under the bottom edges of the plates. The pins 29 of the selecting members 28 are moved into line with the lower ends of the several pawls 37, and when the shaft system 27a–27d is shifted axially, each of the pins 29 will hit one of the pawls 37 and move it out of engagement with the corresponding plate 35, so that the latter slides down to the bottom of the guiding rails 36, in which position it is visible through a suitable window 35b in the housing 35a.

For restoring the indicating plates 35 to their upper inoperative position, there is provided a vertically movable carrier 40, fitted with four horizontal arms 39 which project under the plates 35. The carrier 40, which may be guided in suitable guide rails, is actuated by means of a lever 41 with a handle 42.

The mode of operation of the weighing machine described is as follows:

It is assumed that the weight of the object weighed is 143,600 kilogrammes. The disc 1 has then by the weighing operation been moved to such a position that the perforations of the various groups of the disc 1 in line with the feelers correspond with the values 1, 4, 3 and "600". When now the handle 12 is moved from its initial position, the stop rod 13 will be disengaged from the arms 4, so that the levers 4, 5, 6, 7 may, under the stress of the springs 8, move the feelers 2 into engagement with the perforations in the disc 1. Thereby each of the feelers will be moved a distance corresponding to the value of the related denominational order, so that the types on the printing members 16 which are in line with the printing hammer 18 will also be set at 1, 4, 3, 600. Furthermore the selecting members 28, through the arms 26 and the pins 25, engaging with the arms 6, are turned so that the first of the pins which corresponds to the hundreds, is moved one step forwards, so that it is in line with that plate 35 in the first group of plates which bears the digit 1. In a similar way the remaining selecting members 28 are moved 4, 3 and 3 steps forwards respectively, so that they are in line with plates bearing the digits 4, 3 and 600 respectively.

When the turning of the handle 12 is continued, the shaft 27d will, when it is in line with the cut away portion 32a of the disc 32, move a little to the right under the tension of the spring 34. By this shifting the pins 29 engage and turn the selected pawls 37, so that the plates 35 with the digits 1, 4, 3, and 600 slide down by gravity into a visible position. Thus the weighing value is indicated. When a moment later the shaft 27d is in line with the inclined surface 33, it will be cammed back and disengage the pins 29 from the pawls 37.

Also during the continued turning of the handle 12, the cam disc 20 through the roller 21 will turn the lever 19, so that the stamp 18 will impress the weighing value on the paper slip 17.

Finally the continued turning of the handle 12 will cause the cam disc 9 through the roller 10 and the arms 14 to move the rod 13 into its operative position, whereby all the levers 4, 5, 6, 7 and thereby the feelers 2 and the selecting members 28 are brought back to their initial position.

When it is desired to restore the weight indicator to its initial position for the next weighing operation, the handle 42 is actuated, whereby the shiftable carrier 40 with the arms 39 raise the plates until they are engaged and held in the concealed position in the housing 35a by the pawls 37.

I claim:

1. In a weighing apparatus, a member movable in degree proportional to the setting of the weighing apparatus, a plurality of groups of indicator members, a plurality of displaceable feeler members co-acting with said movable member, one of said feeler members being associated with each group of indicator members, means for selectively controlling movement of said indicator members in dependence upon the amplitude of motion of said feeler members, said selecting means including arms mounted to turn independently of each other about a common axis each in response to movement of one of said feeler members, and means for displacing the several arms as a unit for controlling movement of said indicator members.

2. In a weighing apparatus, a member movable in degree proportional to the setting of the weighing apparatus, a plurality of groups of indicator members, a plurality of displaceable feeler members co-acting with said movable member, one of said feeler members being associated with each group of indicator members, means for selectively controlling movement of said indicator members in dependence upon the amplitude of motion of said feeler members, said selecting means including arms mounted to turn independently of each other about a common axis each in response to movement of one of said feeler members, and means for moving the several rotatable members axially as a unit independently of said feeler members.

3. In a weighing apparatus, a member movable in degree proportional to the setting of the weighing apparatus, a plurality of groups of indicator members, a plurality of displaceable feeler members co-acting with said movable member, one of said feeler members being associated with each group of indicator members, means for selectively controlling movement of said indicator members in dependence upon the amplitude of motion of said feeler members, said selecting means including a multi-armed lever associated with each group of indicator members, the several levers being mounted to turn independently about a common axis and movable axially as a unit, one of the arms of each lever co-acting with the related feeler member and another arm of each lever coacting with one of said groups of indicator members.

4. In a weighing apparatus, a member movable in degree proportional to the setting of the weighing apparatus, a plurality of groups of indicator members, a plurality of displaceable feeler members co-acting with said movable member, one of said feeler members being associated with each group of indicator members, means for selectively controlling movement of said indicator members in dependence upon the amplitude of motion of said feeler members, said selecting means including a multi-armed lever associated with each group of indicator members, the several levers being mounted to turn independently about a common axis and movable axially as a unit, one of the arms of each lever co-acting with the related feeler member, another arm of each lever co-acting with one of the groups of indicator members, and means co-acting with another arm of said multi-armed lever normally tending to project the feeler members to operative position.

5. In a weighing apparatus, a member movable in degree proportional to the setting of the weighing apparatus, a plurality of groups of indicator members, a plurality of displaceable feeler members co-acting with said movable member, one of said feeler members being associated with each group of indicator members, means for selectively controlling movement of said indicator members in dependence upon the amplitude of motion of said feeler members, said selecting means including arms mounted to turn independently of each other about a common axis each in response to movement of one of said feeler members, means for displacing the several arms axially as a unit for controlling movement of said indicator members, and manually controlled means for controlling the axial movement of said arms and for restoring the latter to initial position.

ANTHON JOHANNES BAAGØE.